United States Patent
Wallace et al.

(10) Patent No.: US 11,945,959 B2
(45) Date of Patent: Apr. 2, 2024

(54) WATER-BASED PIGMENT INKS FOR TEXTILES

(71) Applicant: SUN CHEMICAL CORPORATION, Parsippany, NJ (US)

(72) Inventors: Paul Wallace, Derbyshire (GB); James Matthews, Derbyshire (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 18/039,579

(22) PCT Filed: Dec. 16, 2021

(86) PCT No.: PCT/GB2021/053323
§ 371 (c)(1),
(2) Date: May 31, 2023

(87) PCT Pub. No.: WO2022/129917
PCT Pub. Date: Jun. 23, 2022

(65) Prior Publication Data
US 2023/0348744 A1 Nov. 2, 2023

Related U.S. Application Data

(60) Provisional application No. 63/142,101, filed on Jan. 27, 2021, provisional application No. 63/127,295, filed on Dec. 18, 2020.

(51) Int. Cl.
| | |
|---|---|
| *C09D 11/322* | (2014.01) |
| *B41J 2/14* | (2006.01) |
| *B41J 2/21* | (2006.01) |
| *B41M 5/00* | (2006.01) |
| *B41M 5/52* | (2006.01) |
| *C09D 11/38* | (2014.01) |
| *D06P 5/30* | (2006.01) |

(52) U.S. Cl.
CPC .............. *C09D 11/322* (2013.01); *B41J 2/14* (2013.01); *B41J 2/2107* (2013.01); *B41M 5/0047* (2013.01); *B41M 5/5209* (2013.01); *C09D 11/38* (2013.01); *D06P 5/30* (2013.01); *D10B 2201/02* (2013.01); *D10B 2321/041* (2013.01); *D10B 2331/04* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 6,011,098 | A | 1/2000 | Kashiwazaki |
| 6,136,890 | A | 10/2000 | Carolson et al. |
| 6,838,521 | B2 | 1/2005 | Yoon et al. |
| 8,153,706 | B2 | 4/2012 | Vasudevan et al. |
| 8,946,320 | B2 | 2/2015 | Guo et al. |
| 10,106,696 | B2 | 10/2018 | Liu et al. |
| 2002/0003517 | A1 | 3/2002 | Waki |
| 2004/0155947 | A1* | 8/2004 | Ozawa ................... C09D 11/40 347/100 |

(Continued)

FOREIGN PATENT DOCUMENTS

| | | |
|---|---|---|
| CN | 101171312 A | 4/2008 |
| CN | 101595184 A | 12/2009 |

(Continued)

OTHER PUBLICATIONS

International Search Report issued in International Application No. PCT/GB2021/053323, mailed Mar. 17, 2022.
Written Opinion of the International Searching Authority issued in International Application No. PCT/GB2021/053323, mailed Mar. 17, 2022.
International Preliminary Report on Patentability (Chapter 1 of the Patent Cooperation Treaty) issued in International Application No. PCT/GB2021/053323, mailed Mar. 22, 2023.

(Continued)

*Primary Examiner* — Manish S Shah
(74) *Attorney, Agent, or Firm* — Luke Sande

(57) ABSTRACT

The present invention relates to a method of printing an image on a fibrous substrate by inkjet printing, wherein the method comprises applying a water-based ink composition onto the substrate, wherein the ink composition comprises a carboxylic or sulfonic acid functional co-polymer having an acid number of ≥225 mg KOH/g, a pigment, water and at least one organic co-solvent. The present invention also relates to use of said water-based ink composition for printing an image on a fibrous substrate by inkjet printing.

22 Claims, No Drawings

(56) References Cited

U.S. PATENT DOCUMENTS

| | | | |
|---|---|---|---|
| 2005/0206703 A1* | 9/2005 | Guo | C09D 11/322 |
| | | | 347/100 |
| 2006/0014856 A1 | 1/2006 | McGorrin et al. | |
| 2012/0218359 A1* | 8/2012 | Roberts | B41J 2/2107 |
| | | | 347/100 |
| 2017/0145239 A1* | 5/2017 | Mozel | B41J 2/2107 |
| 2018/0105710 A1* | 4/2018 | Hong | B41J 2/17506 |
| 2018/0194128 A1* | 7/2018 | Akhter | B41M 5/52 |
| 2018/0362787 A1 | 12/2018 | Ozawa | |
| 2023/0312951 A1* | 10/2023 | Wallace | B41M 5/0023 |
| | | | 347/100 |

FOREIGN PATENT DOCUMENTS

| | | |
|---|---|---|
| CN | 102807784 A | 12/2012 |
| CN | 111 393 569 A | 7/2020 |
| EP | 1396527 B1 | 4/2006 |
| EP | 3380572 B2 | 10/2018 |
| EP | 3063238 B1 | 8/2020 |
| GB | 2 562 311 A | 11/2018 |
| JP | 10330663 A | 12/1998 |
| JP | H11 140365 A | 5/1999 |
| JP | 2002 121438 A | 4/2002 |
| JP | 2005 041992 A | 2/2005 |
| JP | 2006 225564 A | 8/2006 |
| JP | 4126589 B2 | 7/2008 |
| JP | 4608854 B2 | 11/2011 |
| JP | 2012036287 A | 2/2012 |
| JP | 5144951 B2 | 2/2013 |
| JP | 6089915 B2 | 3/2017 |
| KR | 20020053332 A | 7/2002 |
| WO | WO 2019/203784 A1 | 10/2019 |

OTHER PUBLICATIONS

China National Intellectual Property Administration Text of the First Office Action of INPADOC Family Member Application No. CN2021800859225 (Publication No. CN116745372A).

* cited by examiner

WATER-BASED PIGMENT INKS FOR TEXTILES

CROSS REFERENCE TO RELATED APPLICATIONS

The present application is a § 371 National Phase application based on PCT/GB2021/053323 filed Dec. 16, 2021, which claims the benefit of U.S. Provisional Application Nos. 63/127,295, filed Dec. 18, 2020 and 63/142,101 filed Jan. 27, 2021, the subject matter of each of which is incorporated by reference in their entirety.

The present invention relates to a method of printing an image on a fibrous substrate (e.g. a textile) by inkjet printing comprising applying a water-based ink composition onto the substrate. The present invention also relates to the use of a water-based ink composition for printing an image on a fibrous substrate (e.g. a textile) by inkjet printing.

Decoration of fibrous substrates by inkjet printing is difficult to achieve without the need for complex inks and processes. The challenges facing this sector are to combine the performance of the decorated article, such as excellent wash, rub and crock fastness, whilst retaining the soft hand of the fabric. Furthermore, many pigmented inks pose major challenges in that they require good jetting and printed image quality, excellent ink storage stability, long open time, excellent resolubility and good printer maintenance. Furthermore, typically complex chemical pre-treatments and ink binders are needed to enable printing onto fibrous substrates such as leather, wallpaper, polyester, PET, silk, rayon, fiberboard and cardboard.

There are many current challenges with the future generations of water-based pigment inks for printing onto non-porous (and also porous) substrates. The challenges are both physical, chemical and physico-chemical. From the perspective of the printing press and printer maintenance, the inks must give excellent jetting performance from the print heads; long open times (in the event the printing heads are not capped appropriately) which have a quick start-up; good resolubility in the case that inks are left to dry in the machine and the machine can be flushed and recovered; and do not settle during operation of the printer when ink re-circulating systems are being used. In terms of the ink and the substrate interactions, the inks must bind well to the substrates, preferably without the need for chemical pre-treatments or chemical primers (it is common practice in the inkjet industry for most substrates to be "de-greased" prior to printing using a corona treatment on-line or off-line). The color of the inks must be vibrant, and the inks when bound to the surface must be able to withstand a multitude of physical tests such as adhesion, scratch resistance, alcohol rub resistance, water resistance and crinkling/warping tests. Furthermore, the inks should preferably be capable of printing on the top of base color coats, have top color coats printed on top of them and be able to withstand various textile lamination processes.

Water-based pigmented ink formulations that can be used for inkjet printing directly onto fibrous substrates (such as textiles) and that display a trade-off with all the necessary parameters discussed above that are required from a high-performing ink in the industrial inkjet textile sector are not known in the art.

U.S. Pat. No. 6,838,521B2 (Sejong University) refers to polymer materials, containing tri-random co-polymers of poly(styrene-acrylic acid), poly(styrene-maleic anhydride) and poly(vinylpyrrolidinone) that can be synthesised and used as a dispersant for inkjet inks. The synthesis of such tri-random co-polymers is complex and costly and the manufacture of inkjet inks in this patent required removal of large particles (presumably insoluble polymers or pigment aggregates) by filtration. There is no evidence in the patent that incorporation of such tri-random co-polymers into inkjet inks to provide any advantages over the known art. Furthermore, the ink formulations which are exemplified in U.S. Pat. No. 6,838,521B2 are complex, and the binding behaviour of the inks on industrial substrates is not disclosed. Also, the patent is essentially at least three steps, which involves the condensation of poly(maleic anhydride) with at least two other co-polymers, then a milling step to use the tri-random co-polymer as dispersant and finally an ink letdown stage.

JP4126589B2 (Toda Kogyo Corporation) refers to carbon black particles, dispersions and inks which are prepared from a dispersion containing a di-block co-polymer. This polymer is made from poly(acrylic acid) and poly(styrene-maleic acid). Again, the process to make the inks and polymers is laborious and furthermore the ink formulations derived from this patent are only used for printing onto porous papers for small office, home office (SOHO) use. There is no extension of the use of this co-polymer to organic pigments (for example, pigment blue 15) which would indicate that the dispersions and inks derived from the patent are only matched with the dispersant when used with specific grades of the inorganic pigment carbon black.

JP6089915B2 (Toyo Ink) refers to a series of white inkjet ink formulations based exclusively on the inorganic pigment titanium dioxide ($TiO_2$). The dispersants cited are prepared from reacting an alpha-olefin with maleic acid or maleic anhydride. Styrene is not mentioned in this patent and there is no teaching about the potential prospect of using styrene-maleic acid as a dispersant, surfactant and binding polymer in an ink. Furthermore, JP6089915B2 is limited to white $TiO_2$-based inks only.

U.S. Ser. No. 10/106,696B2 (Cabot Corporation) refers to inkjet inks for the inorganic pigment carbon black (specifically furnace black) which contain a polymeric dispersant which can be styrene-maleic acid co-polymer and additionally at least a polyurethane binder and a surfactant. The patent is concerned with carbon black inks for printing onto paper only. It teaches that different types of carbon black pigments can be incorporated into inkjet inks using these types of formulations. In the current invention, the combination of a styrene-maleic acid co-polymer in combination with a polyurethane polymer binder is not required.

JP10330663A (Fujitsu) refers to a carbon black inkjet ink for printing onto paper. An anionic acrylic polymer which has a pH>7, a surface tension <50 dyne/cm and a Mw of <80,000 Daltons is described. In an example, a carbon black ink is prepared from maleic acid-styrene copolymer, carbon black, a defoaming agent, water and diethylene glycol. This ink is directed at printing onto absorbent substrates, specifically paper, which do not need a binder. Furthermore, JP10330663A is concerned with inks for filling cartridges for SOHO use, not industrial use.

KR20020053332A (Cheil Industries); JP5144951B2 (The Inctec Inc.); U.S. Pat. No. 6,136,890A (Minnesota Mining & Manufacturing Co.); EP3380572B2 (Eastman Kodak); JP2012036287A (Ricoh); EP3063238B1 (DuPont); EP1396527B1 (Seiko-Epson); U.S. Pat. No. 8,153,706B2 (HP); U.S. Pat. No. 8,946,320B2 (HP); and JP4608854B2 (DIC) also relate to ink compositions comprising acid functional co-polymers.

It is an object of the present invention to address one or more of the problems mentioned above. In particular, it is an object of the present invention to provide a water-based pigmented ink formulation that can be used for inkjet printing onto fibrous substrates such as textiles and which displays the characteristics required for a high-performing ink in the industrial inkjet sector, including good jetting and printed image quality, excellent ink storage stability, long open time, excellent resolubility and good printer maintenance. The inks of the present invention can leverage the same base dispersion technologies and be converted to inks with slightly different physical properties to cover most of the demands from the industrial textile inkjet printing market. The inks are suitable for printing directly onto substrates which do not have a chemical pre-treatment. Alternatively, where a chemical pre-treatment is used, the inks demonstrate an equally good printing performance.

DETAILED DESCRIPTION

The inventors have developed a series of ink formulations using water- and solvent-water-insoluble pigments (i.e. pigments that are insoluble in a blend of solvent and water), based on a single carboxylic or sulfonic acid functional polymer type (such as a poly(styrene-maleic acid) co-polymer and/or poly(styrene-maleamic acid) co-polymer) as a dispersant, surfactant and binder to formulate a pigmented ink set that can be used for inkjet printing onto fibrous substrates. The inks developed using a carboxylic or sulfonic acid functional co-polymer (preferably a poly(styrene-maleic acid) co-polymer and/or poly(styrene-maleamic acid) co-polymer) are suitable for printing onto a variety of different fibrous substrates which have significantly different weave pitch and surface energies. Furthermore, in preferred aspects of the present invention, chemical pre-treatment of the substrate is not required, which is unexpected for such water-based inks when printing on fibrous substrates. The single acid-functional dispersant, surfactant and binder can be a class of polymers other than poly(styrene-maleic acid) co-polymers and poly(styrene-maleamic acid) co-polymers such as poly(acrylic acid), poly(methyl methacrylic acid), etc. A second polymer which is not the same as the first polymer can optionally be used to help with viscoelastic properties of the inks and binding to the substrates. These second polymers are preferably selected from the list comprising polyacrylic acids, polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Surprisingly, using a single type of acid-functional polymer (e.g. a single poly(styrene-maleic acid) co-polymer and/or poly(styrene-maleamic acid) co-polymer) as the dispersant, binder and surfactant, produced ink films which were durable, with good colour intensity and a host of other attributes.

As used herein, the term "single polymer type" means all the polymers in the ink belong to the same class, e.g. they are all poly(styrene-maleic acid) co-polymers and/or poly(styrene-maleamic acid) co-polymers as defined herein. Accordingly, in a preferred embodiment, no additional polymer types (e.g. a polyurethane) are required in the ink used in the present invention. As defined herein, poly(styrene-maleic acid) co-polymers and poly(styrene-maleamic acid) co-polymers belong to the same class, i.e. together they are a single polymer type.

Preferably, the inks used in the present invention are water-based and can be printed onto a diverse number of different fibrous substrates directly. Indeed, it is highly unexpected that the inks could be printed directly a non-treated woven plastic substrate such as polyester or PET while providing a good, durable image. Furthermore, reliability in the printing press is important. The inks used in the present invention preferably display excellent re-solubility and open time, meaning the printing press can be used for longer periods without any need for preventative maintenance. Finally, the wash, crock and rub fastness of the cured films is preferably good and the fabrics remain soft to the touch.

Preferably, the substrate used in the present invention does not contain a chemical primer or chemical pre-treatment layer on its surface, and so the ink is printed directly onto the substrate. As will be understood in the art, a chemical primer layer is an intermediary layer between the substrate and the ink that facilitates adhesion between the substrate and the ink. Similarly, it will be understood in the art that chemical pre-treatment of a substrate involves applying a chemical substance to the substrate before printing which binds to the substrate and which facilitates adhesion between the substrate and the ink.

As will be understood in the art, a chemical primer or chemical pre-treatment is distinct from a physical pre-treatment of the substrate. Accordingly, the substrate suitable for use in the present invention may be subjected to a physical pre-treatment prior to being printed, for example a plasma pre-treatment.

The present invention provides a method of printing an image on a fibrous substrate by inkjet printing, wherein the method comprises applying a water-based ink composition onto the substrate, wherein the ink composition comprises a carboxylic or sulfonic acid functional co-polymer having an acid number of ≥225 mg KOH/g, a pigment, water and at least one organic co-solvent.

The present invention also provides use of a water-based ink composition for printing an image on a fibrous substrate by inkjet printing, wherein the ink composition comprises a carboxylic or sulfonic acid functional co-polymer having an acid number of ≥225 mg KOH/g, a pigment, water and at least one organic co-solvent.

As used herein, carboxylic acid functional co-polymers include co-polymers having both acid and amide functional groups, e.g. poly(styrene-maleamic acid) co-polymers.

Using a single carboxylic or sulfonic acid functional polymer, such as a poly(styrene-maleic acid) co-polymer and/or poly(styrene-maleamic acid) co-polymer), as the dispersant, surfactant and binder in a digital ink is not known in the art. Surprisingly, only very small quantities of the polymer (such as about 0.01 to about 10% by weight, preferably about 0.1 to about 5% by weight) are required in an ink to impart the stability, jetting and physical properties of the ink films when cured. Indeed, only 0.5% w/w of active polymer in the ink was found to give acceptable properties (e.g. resolubility and open time). This is particularly surprising given the high degree of fixation which the printed and cured ink films displayed.

Preferably, the carboxylic or sulfonic acid functional co-polymer used in the present invention is a solution-soluble co-polymer. As is understood in the art, the term "solution-soluble" co-polymer (e.g. a solution-soluble poly(styrene-maleic acid) co-polymer, and also known as an alkali-soluble polymer or a solution-polymer) typically refers to co-polymers that comprise acidic groups (including acid derivatives such as anhydrides) as part of the monomer blend. When the acidic groups of the polymer are neutralized with a base the polymers can then be dissolved in water to form an aqueous solution.

Preferably, the methods and uses according to the present invention do not require a chemical primer layer or chemical pre-treatment on the substrate prior to inkjet printing.

The inks used in the present invention have good resolubility and good film forming properties despite there being no requirement for a crosslinker or second polymer type in the ink.

In a preferred embodiment, the present invention provides use of a water-based pigment ink set comprising at least a pigment colorant, a poly(styrene-maleic acid) co-polymer and/or a poly(styrene-maleamic acid) co-polymer, water, an organic solvent and optionally an additional surfactant.

In another preferred embodiment, the present invention provides use of a water-based pigmented ink set comprising at least a pigment colorant; an acid functional polymer selected from the classes of poly(acrylic acid), styrene/acrylic acid copolymers, styrene/maleic acid copolymers, styrene/maleamic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers as co-polymer; water; an organic solvent; and optionally an additional surfactant.

The present invention provides a method for preparing the water-based ink described herein, comprising the steps of:
  i. Preparing a pigment dispersion by mixing a pigment powder together with at least poly(styrene-maleic acid) or other acid functional polymer as a dispersant, deionised water, and milling the slurry until the required particle size is obtained; the individual pigment or colorant dispersions can be subjected to milling to liberate a pigment or colorant dispersion which is stable and the pigment particles having an average particle size (Z-average) of between 100 nm and 250 nm, as determined by ISO 13320:2009(E); and
  ii. Adding water, an organic solvent and optionally additional other chemical agents to said dispersions, thereby obtaining water-based inks.

The present invention also provides a method for the decoration of a fibrous substrate, preferably a textile or cellulosic substrate that is not a textile, by contacting a substrate with the water-based ink described herein and subsequently fixing the said water-based ink onto said substrate using MR radiation.

Alternatively, the present invention also provides a method for the decoration of leather, fibreboard, cardboard, wallpaper or wood substrate, by contacting a substrate with the water-based ink described herein and subsequently fixing the said water-based ink onto said substrate using heat curing.

The present invention also provides a method for printing a variety of different fibrous substrates, comprising the steps of:
  i. Applying the water-based ink described herein onto the substrate; and
  ii. Fixation of said water-based ink onto said substrate using MR-radiation or thermal curing or directed air drying or steaming or a heat press.

The present invention also provides a decorated fibrous substrate which is prepared by the method of the invention, preferably wherein the decorated substrate is formed from the deposition of an ink incorporating a poly(styrene-maleic acid) co-polymer and/or a poly(styrene-maleamic acid) co-polymer, whereby said substrate can be printed with at least one or more inks and cured by either a serial arrangement of MR lamps or thermally cured using a thermal heating device.

According to the present invention, a series of aqueous pigment inks for use in printing onto rigid and flexible fibrous substrates can be prepared enabling high line speed digital decoration of said substrates with superior print quality.

Ink Additives

The polymeric dispersing agent used in the present invention is preferably a co-polymer or block co-polymer having hydrophilic and hydrophobic functionality incorporated within. The polymeric dispersing agent class in the present invention is advantageously, but not be limited to, the class of poly(styrene-maleic acid) and poly(styrene-maleamic acid) co-polymers (which belong to the same polymeric class).

As will be understood in the art, poly(styrene-maleic acid) co-polymers comprise styrenic and maleic acid repeating units. Similarly, poly(styrene-maleamic acid) co-polymers comprise styrenic and maleamic acid repeating units. As will be further understood in the art, the acidic groups in maleic acid and maleamic acid can form salts with an appropriate neutralizing agent.

Preferably, the maleic acid or maleamic acid repeating unit in the co-polymer is a mono-sodium salt, a di-sodium salt, a mono-ammonium salt, a di-ammonium salt, a mono-quaternary ammonium salt or a di-quaternary ammonium salt.

Preferably, the poly(styrene-maleic acid) co-polymer or poly(styrene-maleamic acid) co-polymer is selected from a di-sodium salt of poly(styrene-maleic acid) co-polymer, a di-ammonium salt of poly(styrene-maleic acid) co-polymer, a mono-ammonium salt of poly(styrene-maleamic acid) co-polymer, a mono-quaternary ammonium salt of poly(styrene-maleamic acid) co-polymer or combinations thereof.

Preferably, the poly(styrene-maleic acid) co-polymer and poly(styrene-maleamic acid) co-polymer used in the present invention do not contain any maleic anhydride residues.

Preferably, the poly(styrene-maleic acid) co-polymer and poly(styrene-maleamic acid) co-polymer do not contain any maleic ester residues.

Preferably, the poly(styrene-maleic acid) co-polymer and poly(styrene-maleamic acid) co-polymer comprise 5 to 50% by weight, preferably 15 to 40% by weight maleic acid or maleamic acid content.

Examples of suitable poly(styrene-maleic acid) co-polymers and poly(styrene-maleamic acid) co-polymers include, but are not limited to poly(styrene-alt-maleic acid) sodium salt solution from Merck, SMA 1000 H, SMA 1000HNa, SMA 2000H, SMA 2000HNa, SMA 3000H, SMA 3000HNa, SMA 1000 AMP, SMA 2000 AMP and SMA 3000 AMP from Polyscope Polymers. Further examples of suitable poly(styrene-maleic acid) co-polymers and poly(styrene-maleamic acid) co-polymers include Xiran 3000 HNa, Xiran 1000A, Xiran 2000A, Xiran 1550H and Xiran 3000H from Polyscope Polymers.

Preferably, the ink compositions comprise the carboxylic or sulfonic acid functional co-polymer in an amount of about 0.01 to about 10% by weight, preferably about 0.1 to about 5% by weight, more preferably about 0.5 to about 3.5% by weight of the composition.

Preferably, the carboxylic or sulfonic acid functional co-polymer used in the present invention has a molecular weight of ≥3,000 Daltons, preferable ≥3,500 Daltons.

Preferably, the carboxylic or sulfonic acid functional co-polymer used in the present invention has a molecular weight of 3,000-20,000 Daltons, preferably 3,500-15,000 Daltons.

The co-polymers may also include examples from styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, poly(styrene sulfonic acid) and salts thereof, among others.

The ink compositions used in the present invention may be, though are not limited to, inkjet ink compositions that can optionally include one or more additives that are compatible with the other components of the composition. Additives can be included in the composition to impart any number of desired properties, including, but not limited to, stability, smear resistance, viscosity, surface tension, coating penetration, optical density, color depth, adhesion, highlighter resistance, resolubility and crust resistance, among others. Suitable additives for such uses and the amounts of such additives used are known and conventionally used in the art.

Examples of additives include, but are not limited to, defoamers, preservatives, surfactants, pH modifiers, viscosity modifiers, humectants, penetrating agents, and additional polymers, among others.

In another embodiment, defoamers can be included in the ink composition to inhibit the formation of foam. Examples of suitable defoamers include, but are not limited to, silicone-based or non-silicone defoamers. Commercially available defoamers include, but are not limited to, Dow Corning® 71 and Dow Corning® 74 (from Dow Corning), TegoAirex® 901W, 902W, 904W from Evonik Industries/Tega, Tergitol® L-61, L-62, L-64 and L-101 (from Dow Chemical). A typical amount (by weight) of defoamer included in the composition is 0.1 to 3% by weight.

In another embodiment, preservatives, such as biocides and fungicides, can be included in the ink composition to inhibit the growth of microorganisms. Examples of suitable preservatives include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, 1-(3-chlorallyl)-3,5,7-triaza-1 azoniaadamantane chloride (CTAC), methylisothiazolinone, and chloromethylisothiazolinone, among others. Commercially available biocides include UCARCIDE® 250 (available from Union Carbide Company), Proxel® CRL, Proxel® BDN, Proxel® GXL, Proxel®XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). Agitan 731 biocide and Acticide M10 biocide may also be used. The preservatives may be used alone or in combination. A typical amount (by weight) of preservative included in the composition is 0.05 to 2% by weight, preferably 0.1 to 1.5% by weight.

In alternative embodiments, additional surfactants can be included to reduce surface tension of the ink composition. The additional surfactant can be an anionic surfactant, non-ionic surfactant or cationic surfactant. Suitable additional surfactants can include, but are not limited to, those listed below and in U.S. Pat. Nos. 5,116,409, 5,861,447 and 6,849,111. Exemplary additional surfactants are commercially available under various trade names, such as the PLURONIC® series (BASF Corporation, Parsippany, N.J.), ILTRONIC® series (BASF Corporation, Parsippany, N.J.), ARQUAD® series (Akzo Chemical Inc., Chicago, Ill.), TRITON® series (Union Carbide Corp., Danbury, Conn.), SURFONIC® series (Texaco Chemical Company, Houston, Tex.), ETHOQUAD® series (Akzo Chemical Inc., Chicago, Ill.), ARMEEN® series (Akzo Chemical Inc., Chicago, Ill.), ICONOL® series (BASF Corporation, Parsippany, N.J.), SURFYNOL® series (Air Products and Chemicals, Inc. Allentown, Pa.), and ETHOMEEN® series (Akzo Chemical Inc., Chicago, Ill.), among others. The additional surfactants can be used alone or in combination. A typical amount (by weight) of surfactant included in the composition is 0.1 to 10% by weight.

As used herein a surfactant is an agent that lowers the surface tension between two substances (e.g. two liquids, a gas and a liquid or a liquid and a solid), whereas a wetting agent lowers the interfacial tension of water allowing it to spread on a solid surface. In a preferred embodiment of the invention, the ink composition does not comprise any additional surfactants (i.e. other than the poly(styrene-maleic acid) or poly(styrene-maleamic acid) co-polymer) but may comprise a wetting agent, for example a polyether siloxane co-polymer such as Tego Wet KL 245 (Evonik).

In embodiments, pH modifiers can be included to adjust or buffer the ink composition to a desired pH. Suitable pH modifiers include, but are not limited to, alkali hydroxides, alkali carbonates and bicarbonates, triethylamine, dimethylethanolamine, triethanolamine, mineral acids, hydrochloric acid, and sulfuric acid, among others. The pH modifiers can be used alone or in combination. A typical amount (by weight) of pH modifier in the composition is 0.1 to 2% by weight.

In embodiments, the ink composition can include one or more viscosity modifiers. Examples of suitable viscosity modifiers include, but are not limited to, resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, hydrophobic ethoxylated urethanes (HEURs), hydrophobically modified alkali swellable emulsions (HASEs), alkali swellable emulsions (ASEs), among others. The viscosity modifiers can be used alone or in combination. A typical amount (by weight) of viscosity modifier in the composition is 0.5 to 10% by weight.

In embodiments, in addition to an organic co-solvent of the fluid carrier component which can function as a humectant, one or more additional humectants can be included in the inkjet ink composition to reduce the rate of evaporation of the water component and prevent an ink composition from drying out in the nozzles of the printhead, which can occur during periods of latency, to minimize clogging of the nozzles. Humectants can be selected from materials having high hygroscopicity and water-solubility. Examples of suitable humectants include, but are not limited to, polyols (e.g., ethylene glycol, monopropylene glycol, dipropylene glycol), alcohol ethers (e.g., diethylene glycol, triethylene glycol), lactams (e.g., 2-pyrrolidone, urea compounds such as urea, 1,3-dimethylimidazolidinone), saccharides (e.g., sorbitol), 1,4-cyclohexanedimethanol, 1-methyl-2-piperidone, N-ethylacetamide, 3-amino-1,2-propanediol, ethylene carbonate; butyrolacetone and Liponic EG-1, among others. There are no particular limitations on the amount used of the humectant. A typical amount (by weight) of humectant in the composition is 0.5 to 30% by weight.

In embodiments, penetrating agents can be included to reduce bleeding of an ink composition when applied to a print substrate such as paper, among others. Examples of suitable penetrating agents include, but are not limited to, alkyl alcohols having 1 to 4 carbon atoms (e.g., ethanol), glycol ethers (e.g., ethylene glycol monomethyl ether), diols (e.g., 1,2-alkyl diols), formamide, acetamide, dimethylsulfoxide, sorbitol and sulfolane, among others. The penetrating agents may be used alone or in combination. A typical amount (by weight) of penetrating agents in the composition is 1 to 20% by weight.

The ink compositions used according to the present invention are advantageous in that a single polymer, preferably a poly(styrene-maleic acid) co-polymer or poly(styrene-maleamic acid) co-polymer can function as the dispersant, surfactant and binder. Accordingly, no additional polymers are required in the ink composition used in the present invention. Nonetheless, in embodiments, the ink composition can optionally include additional polymers (other than the acid-functional co-polymer e.g. water-soluble poly(styrene-maleic acid) co-polymer) to enhance water-fastness, rub and light fastness of an ink image applied to and dried on a print substrate. Examples of such polymers include, but are not limited to, polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Such additional polymers can be used alone or in combination. A typical amount (by weight) of such additional polymers that can be included in the composition is 0.1 to 20% by weight.

Preferably, the printing ink used in the present invention do not include a polyurethane polymer.

In embodiments, the ink composition can optionally include a self-crosslinking polymer to improve the durability of an ink image applied to and dried on a print substrate. Examples of such self-crosslinking polymers for use in the ink compositions include, but are not limited to, self-crosslinking acrylic polymers, styrene-acrylic copolymers, styrene-butadiene latexes, styrene-isoprene latexes, acrylonitrile-butadiene latexes, alkyd dispersions, vinyl polymers, silicone dispersions, polyamide dispersions, chlorinated olefin dispersions, and polyester dispersions, among other self-crosslinking polymers. Such self-crosslinking polymers can be used alone or in combination. A typical amount (by weight) of such self-crosslinking polymers that can be included in the composition is 0.1 to 20% by weight, preferably 1 to 15% by weight.

Other additives that can be included in the ink compositions include, but are not limited to, antioxidants, ultraviolet absorbers, chelating agents, electric conductivity adjusters, oxygen absorbers, anti-kogation agents, anti-curling agents, and fragrances, among others. The amounts of such additives for use in aqueous inkjet ink compositions are known and conventionally used in the art.

Colorants

Suitable colorants that can be used in the ink composition used in the invention include any inorganic and organic pigments and lake dispersions. Pigments refer to a colorant particle that is typically water insoluble. As used herein water- and/or water-solvent-insoluble pigments are insoluble at 25° C.

Suitable pigments that can be used to form the ink compositions disclosed herein may include any organic or inorganic pigment known in the art, including, but not limited to, black, yellow, orange, brown, red, violet, blue, green, fluorescent, metal powder and polymer bond pigments. Pigments also may include, but are not limited to, carbon black, azo pigments, phthalocyanine pigments, anthraquinone pigments, perylene and perynone pigments, polycyclic pigments, naphthol pigments, anthrapyrimidone pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, ovaine lake pigments, metal complex pigments, natural pigments, and inorganic pigments, among others. The pigment particles should be sufficiently small (i.e. have an average particle size of from about 100 nm to about 250 nm) to permit free flow of the ink through the ejecting nozzle of an inkjet printing device.

Suitable colored pigments can include, for example, yellow pigments such as C. 1. Pigment Yellow 1, 2, 3, 4, 5, 6, 10, 12, 13, 14, 16, 17, 24, 55, 61, 65, 73, 74, 81, 83, 93, 94, 95, 97, 99, 100, 108, 109, 110, 117, 120, 123, 124, 128, 129, 133, 138, 139, 147, 150, 151, 153, 154, 155, 156, 167, 168, 172, 173, 174, 175, 176, 177, 179, 180, 181, 182, 183, 184, 185, 187, 188, 190, 191, 192, 193, and 194 among others; red pigments such as, C. 1. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264 among others; violet pigments such as C. 1. Pigment Violet 1, 2, 3, 5, 13, 19, 23, 25, 27, 29, 31, 32, 37, 39, 42, 44, and 50 among others; blue pigments such as C. 1. Pigment Blue 1, 2, 3, 9, 10, 14, 15, 16, 18, 19, 21, 22, 24, 25, 56, 60, 61, 62, 63, 64, 65, and 66, among others; orange pigments such as C. 1. Pigment Orange 1, 2, 5, 6, 7, 13, 14, 15, 16, 17, 19, 22, 24, 31, 34, 36, 38, 40, 42, 43, 44, 46, 48, 49, 51, 59, 60, 61, 62, 63, 64, 65, 66, 67, 68, and 69 among others; green pigments such as C. 1. Pigment Green 1, 2, 4, 7, 8, 10, 34, 36, 45, and 47, among others; brown pigments such as C. 1. Pigment Brown 1, 2, 3, 5, 22, 23, 25, 26, 32, 38, 41, and 42 among others; black pigments such as C. 1. Pigment Black 1, 7, 20, 31, and 32 among others, and white pigments such as titanium dioxide. Commercially available colored pigments may include, for example, Pigment Red 122 and Pigment Violet 19 (available from Lansco Colors, Montvale, NJ. or BASF Color, Charlotte, NC. or Clariant Colors, Charlotte, NC. or Sun Chemical, Cincinnati, Ohio), Pigment Blue 15:1 (available from Fanwood Chemical, Fanwood, N.J.), Pigment Blue 15:3, Pigment 15:4, Pigment Yellow 74 and Pigment Yellow 97 (available from BASF Color, Charlotte, NC. or Clariant Colors, Charlotte, NC. or Sun Chemical, Cincinnati, Ohio), among others. Other suitable pigments may include, but are not limited to Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 146, Solvent Red 160, Solvent Yellow 162, Solvent Violet 10, and Solvent Black 29, among others.

Suitable pigments can also include carbon black, which is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black can be used. This includes channel blacks, gas blacks, lamp blacks, thermal blacks, acetylene blacks and furnace blacks. More particularly, suitable carbon blacks include channel blacks. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R, Cab-O-Jet® 200, Cab-O-Jet® 300, and Cab-O-Jet® 400), Degussa/Orion Carbon (NlPex® 150 IQ, NlPex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, NlPex® 160 IQ, Nipex® 1701Q, Nipex® 1801Q, NlPex® 90, Special black 4, Special black 4A, Special black 5, Special black 6, Special black 100, Special black 250, Color black FW1, Color black FW2, Color black FW2V, Color black FW18, Color black FW200, Color black $150, Color black $160 and Color black S170), Columbian/Birla Carbon (Raven® 780, Raven® 5000 Ull, Raven® 1255, Raven® 2500 U, Raven® 3600 U, Raven® 3500, Raven® 5000, Raven® 7000, Raven® 1220 and Raven® 1225), Mitsubishi Kagaku K. K. (MA8, MA11, MA77, MA100, MA220, MA230, MA600, MCF88, #10B, #20B, #30, #33, #40, #44, #45, #45L, #50, #55, #95, #260, #900, #970, #1000, #2200B, #2300, #2350, #2400B, #2650, #2700, #4000B and CF9), Orient Chemical Industries Ltd. (Bonj et Black CW-1, US 2018/0105710A1 Bonj et Black CW-2, and Bonjet Black CW-3) and Sensient Technologies (Sensijet® Black SDP100, Sensijet® Black SDP1000, and Sensijet® Black SDP2000.

In embodiments, the pigment can be self-dispersing in a selected continuous phase. Self-dispersing pigments are pigments that do not require an additional dispersant for being stable within a polymer composition. In embodiments, a self-dispersing pigment is a pigment that has been functionalized with a dispersing agent such as a molecule containing a hydrophilic functional group, for example, by covalent bonding of the molecule to the surface of the pigment.

In embodiments, the amount (by weight) of the colorant in the inkjet ink compositions is at least 0.1, such as at least 0.5, at least 1, at least 1.5, and at least 2, % by weight. In embodiments, the amount of the colorant is at most 10, such as at most 9, at most 8, at most 7, at most 6, and at most 5% by weight. This includes embodiments in which the amount of the colorant in the compositions is 0.1 to 10% by weight, such as 2 to 5% by weight.

Preferably, the ink compositions used in the present invention comprise a poly(styrene-maleic acid) or poly(styrene-maleamic acid) co-polymer and pigment in a weight ratio of from about 20:1 to about 1:20, preferably from about 10:1 to about 1:10, more preferably from about 5:1 to about 1:5.

A colorant used in the inventive inkjet ink compositions can comprise one or more embodiments described herein.

Fluid Carrier

The inkjet ink compositions comprise a fluid carrier which, in embodiments, comprises water and one or more organic co-solvents, which can be water-soluble organic co-solvents, water-miscible organic co-solvents, or a combination thereof. The organic co-solvents can be added either alone or in combination.

In embodiments, the organic co-solvents are humectants, which can reduce the rate of evaporation of the water component and prevent an ink composition from drying out or crusting in the nozzles of the printhead to minimize clogging of the nozzles. In embodiments, the organic co-solvents can enhance solubility of the components in the inkjet ink composition and facilitate penetration of a printed ink composition into a substrate.

Suitable water-soluble and water-miscible organic solvents include, but are not limited to, alcohols (e.g., methanol, ethanol, propanol, isopropyl alcohol, butanol, polyols, ethylene glycol, propylene glycol, dipropylene glycol and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others). Preferably, the organic co-solvent is propylene glycol and/or dipropylene glycol.

In embodiments, the amount (by weight) of the organic co-solvent in the inkjet ink composition is at least 1, such as at least 5, and at least 10, % by weight. In embodiments, the amount (by weight) of the organic co-solvent is at most 80, such as at most 70, at most 60, and at most 50% by weight. This includes embodiments in which the amount of the organic co-solvent in the composition is 1 to 80% by weight, such as 10 to 50% by weight.

An organic co-solvent used in the inventive ink compositions can comprise one or more embodiments described herein.

Preferably, the inks used in the present invention are water-based. Unless stated otherwise, water-based inks comprise at least 20, at least 25, and at least 30% by weight. In embodiments the amount (by weight) of water is at most 95, at most 85, at most 80, at most 75, at most 70, at most 65, and at most 60% by weight. This includes embodiments in which the amount of water in the composition is 20 to 95% by weight, such as 20 to 80, and 30 to 70% by weight. The range of water in the composition is typically 30 to 75% by weight, and more typically 30 to 60% by weight.

Preparation of the Inkjet Ink Compositions

The invention also provides methods of preparing the inkjet ink compositions described herein. In some embodiments, the inkjet ink compositions of the invention can be prepared by mixing a dispersion of a pigment in water and a carboxylic or sulfonic acid functional co-polymer dispersant, preferably a poly(styrene-maleic acid) co-polymer or a poly(styrene-maleamic acid) co-polymer dispersant, with at least an organic solvent, further quantities of a poly(styrene-maleic acid) co-polymer or a poly(styrene-maleamic acid) co-polymer and a biocide.

In embodiments, the inkjet ink composition can be prepared by mixing a pigment in water and a carboxylic or sulfonic acid functional co-polymer dispersant, preferably a poly(styrene-maleic acid) co-polymer or a poly(styrene-maleamic acid) co-polymer dispersant, with at least an organic solvent, fluid carrier, an optional crosslinking agent, and optional additives.

In embodiments, the fluid carrier can be prepared by combining one or more water-soluble organic co-solvents, one or more water-miscible organic co-solvents or a mixture thereof, with water, which can be combined with the other components of the composition. In embodiments, the organic co-solvent(s) and water of the fluid carrier can be combined directly with carboxylic or sulfonic acid functional co-polymer, colorant(s), optional crosslinking agent and optional additives.

An ink composition used according to the invention can comprise a combination of two or more embodiments described herein.

The water-based inks are prepared in the normal manner. A dispersion of the pigment can be prepared in the traditional manner using high shear mixing to form a concentrate pre-mix and then milling. Normally, the carrier liquid, which can be water, or another solvent liquid, is mixed under high shear conditions with a dispersing agent and a wetting agent whilst a powder of the pigment is added. The resulting mixture is typically mixed under high shear conditions for a short time before charging to a bead mill, for example a Netzsch or Buhler mill. The suspension is milled for a fixed time until the desired particle size of the dispersion is reached—typically 100-150 nm (Z-average particle size). At this time, the dispersion is usually discharged from the mill through a filter cartridge into a holding or storage vessel. The dispersions can be made separately, or the two pigments can be combined as powders at the start and essentially co-processed together through the high shear mixing and milling phases.

The ink is prepared in the normal manner for an aqueous pigment ink. To the stirred liquid comprising of water, or another suitable solvent, is added the co-solvents. The colorant dispersion(s) are then added slowly, and the other components of the ink are then added—this may be components such as biocides or preservatives, binders, polymers, resins, surfactants, wetting agents and small quantities of other co-solvents. The ink is pumped under positive pressure through a cartridge filter and packed.

Methods of Printing

The invention further includes methods of printing an image on a fibrous substrate by applying an inkjet ink composition disclosed herein onto the substrate. Preferably, the inkjet ink compositions disclosed herein are adapted for use with an inkjet printing apparatus.

In the method of printing an image according to the invention, droplets of an inkjet ink composition as disclosed herein are ejected from a small nozzle of a printhead and deposited onto a print substrate to generate an image thereon. Suitable inkjet ink printing apparatus can include, but are not limited to, Drop-on-Demand Valve (DoD Valve), MEMS technology and Drop-on-Demand PiezoElectric (DoD Piezo).

As used herein, a fibrous substrate is a material that is composed from fibres, which may be natural fibres or synthetic fibres. Preferably, the fibrous substrates that are suitable for use in the present invention are made from natural fibres such as cellulose or protein (e.g. collagen) fibres. Preferably, the fibrous substrate is composed from natural fibres and is selected from wood (e.g. fiberboard), paper (e.g. wallpaper or cardboard), leather, silk, cotton, wool (e.g. merino wool or cashmere), hemp, ramie, sisal, bamboo, flax or blends of the same.

As will be appreciated in the art, wood, cotton, hemp, ramie, sisal, bamboo and flax comprise cellulose fibres and can therefore be referred to as cellulosic substrates. However, the present invention is not limited to natural cellulosic substrates and also includes synthetic cellulosic substrates such as rayon. As used herein rayon substrates include viscose rayon, modal rayon acetate rayon and lyocell rayon.

As will be understood in the art, the term "fibrous" used in connection with cellulosic substrates does not refer to polymeric cellulosic chains, but instead to the fibres formed by multiple polymeric cellulosic chains which are bound together by intermolecular forces between chains to form cellulose fibres comprising many tens of polymer chains as, for instance, found in naturally occurring cellulosic fibre such as cotton.

Preferably, the fibrous substrates that are suitable for use in the present invention are made from or are synthetic fibres. Preferably, the synthetic fibres that can be used in the present invention are selected from MET-OPP (Metalized Orientated Polypropylene), PA (polyamide e.g. Nylon), spandex, polyester, PET (Polyethylene Terephthalate), MET-PET (Metallized Polyethylene Terephthalate), PP (polypropylene), PVC (Polyvinyl Chloride) or blends of the same. Accordingly, preferably the fibrous substrate is composed from synthetic fibres and is selected form MET-OPP (Metalized Orientated Polypropylene), PA (polyamide e.g. Nylon), spandex, polyester, PET (Polyethylene Terephthalate), MET-PET (Metallized Polyethylene Terephthalate), PP (polypropylene), PVC (Polyvinyl Chloride) or blends of the same.

Preferably, the fibrous substrate is a textile. As will be understood in the art, textiles are formed from weaving, knitting, crocheting, knotting, tatting, felting, bonding and/or braiding yarns, which themselves are formed from fibres. The textile substrates suitable for use in the present invention may be formed from or are any one or more of the fibres described herein. According, the textile substrate can preferably be formed from or is cotton, rayon, silk, polyester, PET, spandex, nylon, leather, wool, hemp, ramie, sisal, bamboo, flax, MET-OPP (Metalized Orientated Polypropylene), MET-PET (Metallized Polyethylene Terephthalate), PP (polypropylene), PVC (Polyvinyl Chloride) or blends thereof. Preferably the textile substrate is canvas, chenille, chiffon, crepe, damask, georgette, gingham, jersey, lace, linen, polyvinyl chloride, leather, merino wool, modal, muslin, organza, satin, spandex, suede, taffeta, toile, tweed, twill and velvet.

Preferably, the textile is a non-woven textile.

Preferably, the substrates used in the present invention are selected from textile materials, woods, bamboo, leather, wallpapers, fiberboards and cardboard.

The inkjet ink compositions used in the present invention are formulated to have properties that allow for at least one of the following: 1) uniform, bleed-free print images with high resolution and high density on a print substrate; 2) inhibition or prevention of nozzle clogging which typically occurs due to drying of the ink at a distal end of a nozzle of the printing apparatus; 3) rapid drying on a print substrate (paper, fabric, etc.); 4) long-term storage stability; and 5) print characteristics that are independent of the print substrate quality. The inkjet ink compositions can also provide ink stability and robustness against fluctuating temperature conditions which can occur during transport and storage, to eliminate or inhibit nozzle clogging, banding, and poor print quality.

The inkjet ink compositions used in the present invention can advantageously be used in industrial inkjet processes and can be adapted specifically for use in textile articles and textile printing processes. The inkjet ink compositions adapted for textile printing can be formulated to have at least one of the following properties: 1) fastness to textiles such as cotton, wool, hemp, linen, ramie, sisal, rayon, cellulose acetate, bamboo, flax, woven MET-PET (Metalized Orientated Polypropylene), PA (polyamide, Nylon), PET (Polyethylene Terephthalate), MET-PET (Metallized Polyethylene Terephthalate), PP (polypropylene) and PVC (Polyvinyl Chloride) or blends of the same; and 2) ease of application and fixation to the textile substrate.

The ink is then suitable for use in an industrial high-speed digital printing press for the decoration of textiles and other substrates (for example, wallpapers). On printing the films, with the combination of the black ink, and standard inks of other colours comprising at least Cyan, Magenta and Yellow, and may also include, but not limited to spot colours such as Red, Orange, Violet and Green, the sequence of printing by digital means the separate colours and drying the resulting deposited wet inks by Near Infra-Red lamps at full power, enables the printing press to run at full speed and results in no deformation of the printed films. The end result is a very high productivity and a very high final print quality.

Measurement Methods

Acid Value (AV): Acid value (or acid number) is defined as the mass of potassium hydroxide (KOH) in milligrams that is required to neutralize one gram of chemical substance. The acid value is suitably measured in accordance with the ISO 2114:2000(E) (method B) standard.

Particle Size/Average Particle Size: Unless stated otherwise, the terms "particle size" or "average particle size" refer to the Z-average i.e. the harmonic mean from the intensity-weighted distribution as measured by dynamic light scattering (DLS), as defined in ISO 22412:2008.

Nanoscale: In the context of the invention this refers to a particle having one dimension of less than 100 nm, a commonly accepted definition of a nanoparticle.

Polydispersity: Polydispersity (or polydispersity index) as used herein is a measure of the heterogeneity of a sample based on size. Unless stated otherwise, polydispersity was measured using a using a Malvern Zetasizer Nano-S particle size analyzer from Malvern Instruments.

Molecular Weight: The terms "molecular weight" or "average molecular weight" is a reference to the weight average molecular weight (Mw). The molecular weight is suitably measured by techniques known in the art such as gel permeation chromatography. Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 µm mixed, 300 mm×19 mm, Waters Millipore Corporation, Milford, MA, USA) and THF as mobile phase. The skilled person will appreciate that this definition of molecular weight applies to polymeric materials which typically have a molecular weight distribution.

Unless stated otherwise, the viscosities of the inks were measured using a Brookfield DV-II+Pro Viscometer equipped with an Enhanced Brookfield UL Adapter at 60 rpm and 25° C.

Unless stated otherwise, pH and conductivity were measured at 25° C. using an Oakton 510 series pH/conductivity meter.

Unless stated otherwise, dynamic surface tension is measured using a SITA bubble pressure tensiometer at 25° C. and 2.7 Hz and static surface temperature is measure using a SITA bubble pressure tensiometer at 25° C. and a bubble frequency of 0.025 Hz.

The invention is further described by the following numbered paragraphs:

1. A printing ink composition comprising a solution soluble carboxylic or sulfonic acid functional co-polymer as the dispersant, surfactant and pigment binder; a colored pigment, water and at least one organic co-solvent.
2. The composition of paragraph 1, wherein the inks are suitable for deposition through at least a single nozzle.
3. The composition of any preceding paragraph, wherein the solution soluble co-polymer is a poly(styrene-maleic acid) co-polymer.
4. The composition of any preceding paragraph, wherein the only co-polymer is a poly(styrene-maleic acid) co-polymer.
5. The composition of any preceding paragraph, wherein the poly(styrene-maleic acid) co-polymer has an acid value in the range of 200-600 mg KOH/g, more preferably 225-500 mg KOH/g and even more preferably 250-450 mg KOH/g.
6. The composition of any preceding paragraph, wherein the counter-ions are selected from a group containing lithium, sodium, potassium, ammonium, hydrogen and quaternary ammonium salts of organic amines.
7. The composition of paragraph 6, wherein the quaternary ammonium salts of organic amines are selected from the group consisting of primary, secondary and tertiary aliphatic amines, hydroxyl-amines, alkoxyl amines, and combinations thereof.
8. The composition of any preceding paragraph, comprising colorant particles which are at least Dv50 100-500 nm in diameter, more preferably 100-350 nm and even more preferably 100-250 nm.
9. The composition of any preceding paragraph, comprising 0.1-7.5 wt % of a pigment, 0.1-20 wt % of a styrene-maleic acid co-polymer, 2-30 wt % of an organic solvent and the remainder of the formulation deionised water.
10. The composition of any preceding paragraph, wherein the dispersion of a pigment powder is prepared initially using the poly(styrene-maleic acid) as dispersant and surfactant.
11. The composition of any preceding paragraph, wherein the pH of the ink is 7.0-10.5, more preferably 7.5-9.0 and even more preferably 7.9-8.5.
12. The composition of any preceding paragraph, having a static surface tension of <40 dyne/cm, more preferably <36 dyne/cm and even more preferably <35 dyne/cm.
13. The composition of any preceding paragraph, having a dynamic surface tension of <47 dyne/cm at 2.7 Hz, more preferably <42 dyne/cm and even more preferably <40 dyne/cm.
14. The composition of any preceding paragraph, further comprising include at least one additional polymer.
15. The composition of paragraph 14, wherein the at least one additional polymer is selected from the group consisting of polyvinyl alcohols, polyesters, polyester-melamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, and blends thereof.
16. The composition of any preceding paragraph, further comprising a surfactant.
17. The composition of paragraph 16, wherein the surfactant is selected from the group consisting of anionic, cationic or neutral.
18. The composition of any preceding paragraph, wherein the composition is an inkjet ink.
19. A method for printing, comprising applying any one or more of the inks of paragraph 1-18 onto a substrate and curing.
20. The method of paragraph 19, wherein the method of printing is inkjet.
21. The method of paragraph 20, wherein the line speed of the printing press is between 50-600 m/minute (linear), more preferably 100-400 m/min and even more preferably 150-300 m/mm.
22. The method of any one or more of the paragraphs 19-22, wherein the substrate is selected from the group consisting of cotton, rayon, silk, polyester, PET (Polyethylene terephthalate), viscose, nylon, polyamide, canvas, cashmere, chenille, chiffon, crepe, damask, georgette, gingham, jersey, lace, linen, polyvinyl chloride, leather, merino wool, modal, muslin, organza, wood, satin, spandex, suede, taffeta, toile, tweed, twill, velvet and wallpaper.
23. The method of any or more of paragraphs 19-22, wherein the substrates do not contain a chemical primer or chemical pre-treatment layer.
24. The method of any or more of paragraphs 19-22, wherein the substrates contain a chemical primer or chemical pre-treatment layer.
25. The method of any or more of paragraphs 19-22, wherein the ink is printed onto a base coat of a white or other coloured pigment or dye.
26. The method of any or more of paragraphs 19-25, wherein the printing ink is subsequently overprinted with a topcoat.
27. The method of any or more of paragraphs 19-26, wherein the ink is cured using a near infrared (NIR) lamp or infrared lamp.
28. The method of any or more of paragraphs 19-26, wherein the ink is cured using a thermal method at between 30-250° C.
29. The method of any or more of paragraphs 19-26, wherein the ink is cured using an airflow method.
30. The method of any or more of paragraphs 19-29, comprising an inkjet printing head selected from the group consisting of thermal, drop-on-demand, continuous or MEMs.
31. A printed image comprising the composition of any one or more of paragraphs 1-18.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Example 1: Cyan Dispersion and Inks

1a. Cyan Dispersion (3.69% poly(styrene-maleic acid) polymer solids): To a mechanically stirred tank or vessel is added 44.98 kg of deionised water (conductivity less than 25 microSiemens) and 14.74 kg of Xiran 3000 HNa solution (poly(styrene-maleic acid) in water at 25% polymer solids, acid number 255-305 mg KOH/g and molecular weight 10 kD) and the two components mixed using stirring for a few minutes. 0.22 kg biocide was then added with continual stirring of the mixture. The pigment powder, Heliogen Blue D 7086, 14.74 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 25.32 kg of deionised water is added. After mixing for a few minutes, the dispersion is pumped through a 1-micron depth filter (absolute) and stored. The physical properties of the dispersion were measured to give a viscosity of 3.40 cP (measured at 25° C. at low shear (i.e. at 60 rpm) using a Thermo-Haake Rheostress 1); pH 10.0 (measured at 25° C. using an WTW pH-Electrode Sen Tix 81); conductivity 3.0 mScm$^{-1}$ (measured at 25° C. using a WTW Tetra-Con 325); particle size Z-average 128 nm (measured using a Malvern Zetasizer Nano-ZS); pigment solids content 14.70% w/w (measured using a Shimadzu UV-Vis recording Spectrophotometer—UV-2501 PC).

1b. Cyan Ink Set 1 (1.17% (poly(styrene-maleic acid) polymer solids, no additional polymer types): To a mechanically stirred tank or vessel using a saw tooth impellar is added 31.6 kg of the cyan dispersion (Example 1a); followed by deionised water, 26.3 kg; propylene glycol, 34.6 kg; dipropylene glycol, 6.7 kg; and finally silicone wetting agent, 0.8 kg. The mixture was stirred for a further 1 hour at ambient temperature and then the mixture filtered through a 1-micron absolute polypropylene spun depth filter. The physical properties of the ink were measured to give a viscosity of 5.60 cP (measured at 32° C. at low shear (i.e. at 60 rpm) using a Brookfield DV-II+ Viscometer); pH 10.22 (measured at 25° C. using an Oakton 510 series pH/conductivity meter); conductivity 0.259 mScm$^{-1}$ (measured at 25° C. using an Oakton 510 series pH/conductivity meter); dynamic surface tension (measured using a SITA bubble pressure tensiometer): 40.4 mNm$^{-1}$ (measured at 25° C. and 11 Hz), 34.9 mNm$^{-1}$ (measured at 25° C. and 2.7 Hz), 30.4 mNm$^{-1}$ (measured at 25° C. and 0.1 Hz) and 30.1 mNm$^{-1}$ (measured at 25° C. and 0.025 Hz); particle size Z-average 119 nm, Dv50 98 nm, Dv90 218 nm, polydispersity 0.196 (measured using a Malvern Zetasizer Nano-S); resolubility was measured using the test described below and found to be <1 minute.

1c. Cyan Ink Set 2 (2.65% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 1000A 6.25 kg (25% (poly(styrene-maleamic acid) polymer solution in water, acid number 465-500 mg KOH/g and molecular weight 5 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 8.69 cP (measured at 32° C. at low shear (i.e. at 60 rpm) using a Brookfield DV-II+ Viscometer); pH 8.66 (measured at 25° C. using an Oakton 510 series pH/conductivity meter); conductivity 1.471 mScm$^{-1}$ (measured at 25° C. using an Oakton 510 series pH/conductivity meter); dynamic surface tension (measured using a SITA bubble pressure tensiometer): 43.2 mNm$^{-1}$ (measured at 25° C. and 11 Hz), 36.4 mNm$^{-1}$ (measured at 25° C. and 2.7 Hz), 29.8 mNm$^{-1}$ (measured at 25° C. and 0.1 Hz), 29.4 mNm$^{-1}$ (measured at 25° C. and 0.025 Hz); particle size Z-average 130 nm, Dv50 116 nm, Dv90 257 nm, polydispersity 0.206 (measured using a Malvern Zetasizer Nano-S); resolubility was measured using the test described below and found to be <1 minute.

1d. Cyan Ink Set 3 (2.85% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 2000A 6.25 kg (25% (poly(styrene-maleamic acid) solution in water, acid number 335-375 mg KOH/g and molecular weight 7 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 5.03 cP (measured at 25° C. at low shear (i.e. at 60 rpm) using a Brookfield DV-II+ Viscometer); pH 8.72 (measured at 25° C. using an Oakton 510 series pH/conductivity meter); conductivity 0.989 mScm$^{-1}$ (measured at 25° C. using an Oakton 510 series pH/conductivity meter); dynamic surface tension (measured using a SITA bubble pressure tensiometer): 39.8 mNm$^{-1}$ (measured at 25° C. and 11 Hz), 35.0 mNm$^{-1}$ (measured at 25° C. and 2.7 Hz), 31.6 mNm$^{-1}$ (measured at 25° C. and 0.1 Hz) and 31.4 (measured at 25° C. and 0.025 Hz); particle size Z-average 126 nm, Dv50 127 nm, Dv90 205 nm, polydispersity 0.204 (measured using a Malvern Zetasizer Nano-S); resolubility was measured using the test described below and found to be <1 minute.

1e. Cyan Ink Set 4 (2.65% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 3000H, 6.25 kg (25% (poly(styrene-maleamic acid) solution in water, acid number 255-305 mg KOH/g and molecular weight 10 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 4.22 cP (measured at 25° C. at low shear (i.e. at 60 rpm) using a Brookfield DV-II+ Viscometer); pH 9.70 (measured at 25° C. using an Oakton 510 series pH/conductivity meter); conductivity 1.102 mScm$^{-1}$ (measured at 25° C. using an Oakton 510 series pH/conductivity meter); dynamic surface tension (measured using a SITA bubble pressure tensiometer): 45.9 mNm$^{-1}$ (measured at 25° C. and 11 Hz), 39.7 mNm$^{-1}$ (measured at 25° C. and 2.7 Hz), 34.6 mNm$^{-1}$ (measured at 25° C. and 0.1 Hz) and 34.2 mNm$^{-1}$ (measured at 25° C. and 0.025 Hz); particle size Z-average 123 nm, Dv50 145 nm, Dv90 243 nm, polydispersity 0.211 (measured using a Malvern Zetasizer Nano-S); resolubility was measured using the test described below and found to be <1 minute.

1f. Cyan Ink Set 5 (2.65% (poly(styrene-maleic acid) polymer solids, no additional polymer types): To a mechanically stirred tank or vessel using a saw tooth impellar is added 29.6 kg of the cyan dispersion (Example 1a); followed by deionised water, 24.6 kg; propylene glycol, 32.55 kg; dipropylene glycol, 6.25 kg; Xiran 3000HNa, 6.25 kg (25% (poly(styrene-maleic acid) solution in water; acid number 255-305 mg KOH/g and molecular weight 10 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 7.76 cP (measured at 25° C. at low shear (i.e. at 60 rpm) using a Brookfield DV-II+ Viscometer); pH 10.27 (measured at 25° C. using an Oakton 510 series pH/conductivity meter); conductivity 2.24 mScm$^{-1}$ (measured at 25° C. using an Oakton 510 series pH/conductivity meter); dynamic surface tension (measured using a SITA bubble pressure tensiometer): 54.2 mNm$^{-1}$ (measured at 25° C. and 8.1 Hz), 46.4 mNm$^{-1}$ (measured at 25° C. and 2.7 Hz), 36.2 mNm$^{-1}$ (measured at 25° C. and 0.1 Hz), 35.4 mNm$^{-1}$ (measured at 25° C. and 0.025 Hz); particle size Z-average 127 nm, Dv50 106 nm, Dv90 268 nm, polydispersity 0.219 (measured using a Malvern Zetasizer Nano-S); resolubility was measured using the test described below and found to be <1 minute.

1 g. Cyan Ink Set 6 (0.74% (poly(styrene-maleic acid) polymer solids+one additional non-SMA polymer—acrylic): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of biocide; 0.80 kg of sodium dioctyl sulfosuccinate flow additive; 1.20 kg of silicone wetting agent; 1.20 kg of wax emulsion; and 24.00 kg of Joncryl 8050-E (polyacrylic solution at 42% polymer solids in water; acid number 114 mg KOH/g and molecular weight >200 kD). The mixture is stirred until homogenous and then slowly added to a second vessel which is also mechanically stirred using a saw tooth impellar containing the Example 1a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.46 cP (measured at 32° C. at low shear (i.e. at 60 rpm) using a ThermoHaake Rheostress 1); pH 7.91 (measured at 25° C. using a WTW pH-Electrode SenTix 81); conductivity 4.43 mScm$^{-1}$ (measured at 25° C. using a WTW Tetra-Con 325); dynamic surface tension (all measured using a SITA bubble pressure tensiometer): 35.6 mNm$^{-1}$ (measured at 25° C. and 11 Hz), 29.3 mNm$^{-1}$ (measured at 25° C. and 2.7 Hz), 26.4 mNm$^{-1}$ (measured at 25° C. and 0.1 Hz); particle size Z-average 133 nm, Dv50 117 nm, Dv90 237 nm, Dv95 281 nm (measured using a Malvern Zetasizer Nano-ZS). Ink resolubilized in <2 hours.

Example 2: Magenta Dispersion and Inks

2a. Dispersion (4.25% poly(styrene-maleic acid) polymer solids): To a mechanically stirred tank or vessel is added 51.75 kg of deionised water (conductivity less than 25 microSiemens) and 17.00 kg of Xiran 3000 HNa solution (25% (poly(styrene-maleic acid) solution in water; acid number 255-305 mg KOH/g and molecular weight 10 kD) and the two components mixing using stirring for a few minutes. 0.26 kg biocide was then added with continual stirring of the mixture. The pigment powder, Cinquasia Pink K 4430 FP, 17.00 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 13.99 kg of deionised water is added. After mixing for a few minutes, the dispersion is pumped through a 1-micron depth filter (absolute) and stored. The physical properties of the dispersion were measured to give a viscosity of 3.60 cP (measured at 25° C. at low shear (i.e. at 60 rpm) using a ThermoHaake Rheostress 1); pH 9.9 (measured at 25° C. using a WTW pH-Electrode Sen Tix 81); conductivity 3.3 mScm$^{-1}$ (measured at 25° C. WTW Tetra-Con 325); particle size Z-average 127 nm (measured using a Malvern Zetasizer Nano-ZS); pigment solids content 17.0% w/w (measured using a Shimadzu UV-Vis recording Spectrophotometer—UV-2501 PC).

2b. Magenta Ink Set 1 (1.34% (poly(styrene-maleic acid) polymer solids, no additional polymer types): To a mechanically stirred tank or vessel using a saw tooth impellar is added 31.6 kg of the magenta dispersion (Example 2a); followed by deionised water, 26.3 kg; propylene glycol, 34.6 kg; dipropylene glycol, 6.7 kg; and finally silicone wetting agent, 0.8 kg. The mixture was stirred for a further 1 hour at ambient temperature and then the mixture filtered through a 1-micron absolute polypropylene spun depth filter. The physical properties of the ink were measured to give a viscosity of 5.52 cP (measured at 32° C. at low shear (i.e. at 60 rpm) using a Brookfield DV-II+ Viscometer); pH 10.13 (measured at 25° C. using an Oakton 510 series pH/conductivity meter); conductivity 0.305 mScm$^{-1}$ (measured at 25° C. using an Oakton 510 series pH/conductivity meter); dynamic surface tension (measured using a SITA bubble pressure tensiometer): 38.5 mNm$^{-1}$ (measured at 25° C. and 11 Hz), 33.4 mNm$^{-1}$ (measured at 25° C. and 2.7 Hz), 29.3 mNm$^{-1}$ (measured at 25° C. and 0.1 Hz), 29.1 mNm$^{-1}$ (measured at 25° C. and 0.025 Hz); particle size Z-average 126 nm, Dv50 108 nm, Dv90 3740 nm, polydispersity 0.255 (measured using a Malvern Zetasizer Nano-S); resolubility was measured using the test described below and found to be <1 minute.

2c. Magenta Ink Set 4 (2.82% (poly(styrene-maleic acid) polymer solids, no additional polymer types): To a mechanically stirred tank or vessel using a saw tooth impellar is added 29.6 kg of the magenta dispersion (Example 2a); followed by deionised water, 24.6 kg; propylene glycol, 32.55 kg; dipropylene glycol, 6.25 kg; Xiran 3000H, 6.25 kg (poly(styrene-maleamic acid) 25% solution in water, acid number 255-305 mg KOH/g and molecular weight 10 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 4.33 cP (measured at 25° C. at low shear (i.e. at 60 rpm) using a Brookfield DV-II+ Viscometer); pH 9.57 (measured at 25° C. using an Oakton 510 series pH/conductivity meter); conductivity 1.131 mScm$^{-1}$ (measured at 25° C. using an Oakton 510 series pH/conductivity meter); dynamic surface tension (measured using a SITA bubble pressure tensiometer): 45.4 mNm$^{-1}$ (measured at 25° C. and 11 Hz), 38.9 mNm$^{-1}$ (measured at 25° C. and 2.7 Hz), 33.5 mNm$^{-1}$ (measured at 25° C. and 0.1 Hz) and 33.0 mNm$^{-1}$ (measured at 25° C. and 0.025 Hz); particle size Z-average 122 nm, Dv50 147 nm, Dv90 3890 nm, polydispersity 0.239 (measured using a Malvern Zetasizer Nano-S); resolubility was measured using the test described below and found to be <1 minute.

2d. Magenta Ink Set 6 (0.85% (poly(styrene-maleic acid) polymer solids+one additional non-SMA polymer—acrylic): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of biocide; 0.80 kg of sodium dioctyl sulfosuccinate flow additive; 1.20 kg of silicone wetting agent; 1.20 kg of wax emulsion; and 24.00 kg of Joncryl 8050-E. The mixture is stirred until homogenous and then slowly added to a second vessel which is also mechanically stirred using a saw tooth impellar containing Example 2a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.29 cP (measured at 32° C. at low shear (i.e. at 60 rpm) using a Thermo-Haake Rheostress 1); pH 7.90 (measured at 25° C. using a WTW pH-Electrode SenTix 81); conductivity 4.42 mScm$^{-1}$ (measured at 25° C. using a WTW Tetra-Con 325); dynamic surface tension (all measured using a SITA bubble pressure tensiometer): 34.5 mNm$^{-1}$ (measured at 25° C. and 11 kHz), 28.9 mNm$^{-1}$ (measured at 25° C. and 2.7 kHz), 26.1 mNm$^{-1}$ (measured at 25° C. and 0.1 kHz); particle size Z-average 117 nm, Dv50 93 nm, Dv90 191 nm, Dv95 231 nm (measured using a Malvern Zetasizer Nano-ZS). Ink resolubilized in <2 hours.

Example 3: Yellow Dispersion and Inks

3a. Dispersion (4.63% poly(styrene-maleic acid) polymer solids): To a mechanically stirred tank or vessel is added 56.22 kg of deionised water (conductivity less than 25 microSiemens) and 18.50 kg of Xiran 3000 HNa solution (25% (poly(styrene-maleic acid) solution in water; acid number 255-305 mg KOH/g and molecular weight 10 kD) and the two components mixing using stirring for a few minutes. 0.26 biocide was then added with continual stirring of the mixture. The pigment powder, Irgazin Yellow L 2040, 18.50 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 6.50 kg of deionised water is added. After mixing for a few minutes, the dispersion is pumped through a 1-micron depth filter (absolute) and stored. The physical properties of the dispersion were measured to give a viscosity of 4.20 cP (measured at 25° C. at low shear (i.e. at 60 rpm) using a ThermoHaake Rheostress 1); pH 8.9 (measured at 25° C. using a WTW pH-Electrode Sen Tix 81); conductivity 3.4 mScm-1 (measured at 25° C. WTW Tetra-Con 325); particle size Z-average 146 nm (measured using a Malvern Zetasizer Nano-ZS); pigment solids content 18.0% w/w (measured using a Shimadzu UV-Vis recording Spectrophotometer—UV-2501 PC).

3b. Yellow Ink Set 1 (1.46% (poly(styrene-maleic acid) polymer solids, no additional polymer types): To a mechanically stirred tank or vessel using a saw tooth impellar is added 31.6 kg of the yellow dispersion (Example 3a); followed by deionised water, 26.3 kg; propylene glycol, 34.6 kg; dipropylene glycol, 6.7 kg; and silicone wetting agent, 0.8 kg. The mixture was stirred for a further 1 hour at ambient temperature and then the mixture filtered through a 1-micron absolute polypropylene spun depth filter. The physical properties of the ink were measured to give a viscosity of 6.08 cP (measured at 32° C. at low shear (i.e. at 60 rpm) using a Brookfield DV-II+ Viscometer); pH 6.72 (measured at 25° C. using an Oakton 510 series pH/conductivity meter); conductivity 0.159 mScm$^{-1}$ (measured at 25° C. using an Oakton 510 series pH/conductivity meter); dynamic surface tension (measured using a SITA bubble pressure tensiometer): 37.5 mNm$^{-1}$ (measured at 25° C. and 11 Hz), 31.8 mNm$^{-1}$ (measured at 25° C. and 2.7 Hz), 28.0 mNm$^{-1}$ (measured at 25° C. and 0.1 Hz), 27.6 mNm$^{-1}$ (measured at 25° C. and 0.025 Hz); particle size Z-average 122 nm, Dv50 1320 nm, Dv90 2140 nm, polydispersity 0.250 (measured using a Malvern Zetasizer Nano-S); resolubility was measured using the test described below and found to be <1 minute.

3c. Yellow Ink Set 4 (2.95% (poly(styrene-maleic acid) polymer solids, no additional polymer types): To a mechanically stirred tank or vessel using a saw tooth impellar is added 29.6 kg of the yellow dispersion (Example 3a); followed by deionised water, 24.6 kg; propylene glycol, 32.45 kg; dipropylene glycol, 6.3 kg; Xiran 3000H, 6.3 kg (poly(styrene-maleamic acid) 25% solution in water, acid number 255-305 mg KOH/g and molecular weight 10 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 5.07 cP (measured at 25° C. at low shear (i.e. at 60 rpm) using a Brookfield DV-II+ Viscometer); pH 9.13 (measured at 25° C. using an Oakton 510 series pH/conductivity meter); conductivity 1.079 mScm$^{-1}$ (measured at 25° C. using an Oakton 510 series pH/conductivity meter); dynamic surface tension (measured using a SITA bubble pressure tensiometer): 45.2 mNm$^{-1}$ (measured at 25° C. and 11 Hz), 38.2 mNm$^{-1}$ (measured at 25° C. and 2.7 Hz), 32.7 mNm$^{-1}$ (measured at 25° C. and 0.1 Hz), 32.2 mNm$^{-1}$ (measured at 25° C. and 0.025 Hz); particle size Z-average 128 nm, Dv50 165 nm, Dv90 2070 nm, polydispersity 0.240 (measured using a Malvern Zetasizer Nano-S); resolubility was measured using the test described below and found to be <1 minute.

3d. Yellow Ink Set 6 (0.93% (poly(styrene-maleic acid) polymer solids, one additional non SMA polymer): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of biocide; 0.80 kg of sodium dioctyl sulfosuccinate flow additive; 1.20 kg of silicone wetting agent; 1.20 kg of wax emulsion; and 24.00 kg of Joncryl 8050-E. The mixture is stirred until homogenous and then slowly added to a second vessel which is also mechanically stirred using a saw tooth impellar containing the Example 3a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.71 cP (measured at 32° C. at low shear (i.e. at 60 rpm) using a ThermoHaake Rheostress 1); pH 7.86 (measured at 25° C. using a WTW pH-Electrode SenTix 81); conductivity 4.38 mScm$^{-1}$ (measured at 25° C. using a WTW Tetra-Con 325); dynamic surface tension (all measured using a SITA bubble pressure tensiometer): 34.7 mNm$^{-1}$ (measured at 25° C. and 11 kHz), 29.1 mNm$^{-1}$ (measured at 25° C. and 2.7 kHz), 25.6 mNm$^{-1}$ (measured at 25° C. and 0.1 kHz); particle size Z-average 126 nm, Dv50 99 nm, Dv90 222 nm, Dv95 272 nm (measured using a Malvern Zetasizer Nano-ZS). Ink resolubilized in <2 hours.

Example 4: Black Dispersion and Ink

4a. Dispersion (3.5% poly(styrene-maleic acid) polymer solids): To a mechanically stirred tank or vessel is added 41.79 kg of deionised water (conductivity less than 25 microSiemens), and 14.00 kg of Xiran 3000 HNa solution (25% (poly(styrene-maleic acid) solution in water; acid number 255-305 mg KOH/g and molecular weight of kD) and the two components mixing using stirring for a few minutes. 0.21 kg biocide was then added with continual stirring of the mixture. The pigment powder, Raven FC1, 14.00 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is back into a mechanically stirred tank and 30.0 kg of deionised water is added. After mixing for a few minutes, the dispersion is pumped through a 1-micron depth filter (absolute) and stored. The physical properties of the dispersion were measured to give a viscosity of 3.50 cP (measured at 25° C. at low shear (i.e. at 60 rpm) using a ThermoHaake Rheostress 1); pH 9.0 (measured at 25° C. using a WTW pH-Electrode Sen Tix 81); conductivity 3.8 mScm$^{-1}$ (measured at 25° C. WTW Tetra-Con 325); particle size Z-average 140 nm (measured using a Malvern Zetasizer Nano-ZS); pigment solids content 14.0% w/w (measured using a Shimadzu UV-Vis recording Spectrophotometer—UV-2501 PC).

4b. Black Ink Set 1 (1.11% (poly(styrene-maleic acid) polymer solids, no additional polymer types): To a mechanically stirred tank or vessel using a saw tooth impellar is added 31.6 kg of the black dispersion (Example 4a); followed by deionised water, 26.3 kg; propylene glycol, 34.6 kg; dipropylene glycol, 6.7 kg; and finally silicone wetting agent, 0.8 kg. The mixture was stirred for a further 1 hour at ambient temperature and then the mixture filtered through a 1-micron absolute polypropylene spun depth filter. The physical properties of the ink were measured to give a viscosity of 5.63 cP (measured at 32° C. at low shear (i.e. at 60 rpm) using a Brookfield DV-II+ Viscometer); pH 9.33 (measured at 25° C. using an Oakton 510 series pH/conductivity meter); conductivity 0.327 mScm$^{-1}$ (measured at 25° C. using an Oakton 510 series pH/conductivity meter); dynamic surface tension (measured using a SITA bubble pressure tensiometer): 37.4 mNm$^{-1}$ (measured at 25° C. and 11 Hz), 31.8 mNm$^{-1}$ (measured at 25° C. and 2.7 Hz), 28.6 mNm$^{-1}$ (measured at 25° C. and 0.1 Hz), 28.1 mNm$^{-1}$ (measured at 25° C. and 0.025 Hz); particle size Z-average 123 nm, Dv50 144 nm, Dv90 3890 nm, polydispersity 0.247 (measured using a Malvern Zetasizer Nano-S); resolubility was measured using the test described below and found to be <1 minute.

4c. Black Ink Set 4 (2.60% (poly(styrene-maleic acid) polymer solids, no additional polymer types): To a mechanically stirred tank or vessel using a saw tooth impellar is added 29.6 kg of the black dispersion (Example 4a); followed by deionised water, 24.6 kg; propylene glycol, 32.55 kg; dipropylene glycol, 6.25 kg; Xiran 3000H, 6.25 kg ((poly(styrene-maleamic acid) 25% solution in water, acid number 255-305 mg KOH/g and molecular weight of 10 kD); and finally silicone wetting agent, 0.75 kg. The mixture was stirred for a further 1 hour at ambient temperature and then the mixture filtered through a 1-micron absolute polypropylene spun depth filter. The physical properties of the ink were measured to give a viscosity of 4.24 cP (measured at 25° C. at low shear (i.e. at 60 rpm) using a Brookfield DV-II+ Viscometer); pH 9.49 (measured at 25° C. using an Oakton 510 series pH/conductivity meter); conductivity 1.178 mScm$^{-1}$ (measured at 25° C. using an Oakton 510 series pH/conductivity meter); dynamic surface tension (measured using a SITA bubble pressure tensiometer): 45.3 mNm$^{-1}$ (measured at 25° C. and 11 Hz), 38.7 mNm$^{-1}$ (measured at 25° C. and 2.7 Hz), 33.3 mNm$^{-1}$ (measured at 25° C. and 0.1 Hz) and 32.7 mNm$^{-1}$ (measured at 25° C. and 0.025 Hz); particle size Z-average 131 nm, Dv50 113 nm, Dv90 232 nm, polydispersity 0.139 (measured using a Malvern Zetasizer Nano-S); resolubility was measured using the test described below and found to be <1 minute.

4d. Black Ink Set 6 (0.70% (poly(styrene-maleic acid) polymer solids, one additional non SMA polymer): To a mechanically stirred tank or vessel using a saw tooth impellar is added 34.70 kg of deionised water (conductivity less than 25 microSiemens); 13.00 kg of monopropylene glycol; 5.00 kg of dipropylene glycol; 0.10 kg of biocide; 0.80 kg of sodium dioctyl sulfosuccinate flow additive; 1.20 kg of silicone surfactant; 1.20 kg of wax emulsion; and 24.00 kg of Joncryl 8050-E. The mixture is stirred until homogenous and then slowly added to a second vessel which is also mechanically stirred using a saw tooth impellar containing the Example 4a dispersion, 20.00 kg. The mixture is stirred for a further 30 mins following complete addition of the liquids and then pumped through a 1-micron polypropylene (absolute) depth filter to afford the finished ink. The physical properties of the ink were measured to give a viscosity of 4.24 cP (measured at 32° C. at low shear (i.e. at 60 rpm) using a ThermoHaake Rheostress 1); pH 7.87 (measured at 25° C. using a WTW pH-Electrode SenTix 81); conductivity 4.46 mScm$^{-1}$ (measured at 25° C. using a WTW Tetra-Con 325); dynamic surface tension (all measured using a SITA bubble pressure tensiometer): 34.5 mNm-1 (measured at 25° C. and 11 kHz), 28.6 mNm-1 (measured at 25° C. and 2.7 kHz), 25.6 mNm-1 (measured at 25° C. and 0.1 kHz); particle size Z-average 141 nm, Dv50 126 nm, Dv90 237 nm, Dv95 276 nm (measured using a Malvern Zetasizer Nano-ZS). Ink resolubilized in <2 hours.

Printing Method & Results

Ink Examples 1E, 2C, 3C and 4C were printed onto various fabrics with no prior chemical or physical pre-treatment using a Dimatix SMP2800 benchtop printer. The fabrics are as follows: untreated cotton; untreated polyester-cotton (65-35) blend material; untreated PVC-based wallpaper material; coated polyester fabric (Polyester Brook FKPD8 (PE)). Results can be found in Tables 1-8.

The drop size used on the printer was 10 picolitres through a Dimatix DMC-11610 print cartridge. The drop spacings used were 31 and 40 microns. The cartridge temperature was 32° C. and the meniscus set point at 4 inches of water. All 16 nozzles were firing and the throw distance was fixed at 2-3 mm. The inks were applied to the fabric using inkjet deposition from the Dimatix SMP2800 printer. Drawdowns using an industrial coater were also made. The drawdown samples were prepared by using a no. 2 K-bar, automatic coating machine and a speed setting "11". The printed fabrics were then dried in a convection oven for 10 minutes at 60° C. and then heat-treated at 160° C. for 120 seconds. The resulting printed fabrics were then immersed in a beaker containing a 1% w/w solution of Tergitol TMN-6 surfactant (polyethylene glycol trimethyl nonyl ether) in deionised water cleaning liquid. After intervals of 5 minutes, 1 hour and 24 hours of soaking, the washing liquid was visually inspected and found to contain no colorant. The color properties of the printed fabrics were measured before the 24 h soak test and after drying following the 24 h soak test. The fabric color properties were measured using an) (Rite Color i7 machine. In all cases but one, the colour change, ΔE, measured was less than 3, which is a preferred guideline for acceptance in the textile industry and not readily detectable by the human eye. In one case (Example 3C on 100% cotton), the ΔE was between 3-4, which is less preferred, but also considered a passing result. The washing liquid color properties were also tested in order to determine if any colorant had washed off into the liquid. This was also done using the)(Rite Color i7 machine. In all cases, the ΔE was below 1.00, indicating no detectable colorant washed off the fabrics. This demonstrates that the inks bind very well to all the fabrics.

TABLE 1

ΔE Values of Ex. 1E Cyan digitally printed and dried on various fabrics. ΔE values (ink films) indicates color change of the fabrics before and after washing liquid immersion; ΔE (wash solution) indicates color change of the wash solution after the prints were immersed.

| Example | Substrate | Drop spacing (μm) | ΔE (ink films) | ΔE (wash solution) |
|---|---|---|---|---|
| Ex. 1E Cyan | 100% cotton | 31 | 0.39 | 0.69 |
| | | 40 | 0.90 | |
| | 65% PE 35% cotton | 31 | 2.25 | 0.37 |
| | | 40 | 1.80 | |
| | Polyester Brook FKPD8 (PE) | 31 | 1.35 | 0.07 |
| | | 40 | 1.45 | |
| | PVC wallpaper | 31 | 1.30 | 0.13 |
| | | 40 | 1.30 | |

As can be seen in Table 1, ΔE values of the cured digital ink films and washing liquid before and after submersion are all below the preferred maximum of 3.00. ΔE values of the wash solution are all below 1.00. The ΔE figures are indicative of good binding between ink and substrate.

TABLE 2

ΔE Values of Ex. 1E Cyan drawdowns dried and immersed in washing liquid. ΔE values (ink films) indicates color change of the drawdowns before and after washing liquid immersion; ΔE (wash solution) indicates color change of the wash solution after the prints were immersed.

| Example | Substrate | ΔE (ink films) | ΔE (wash solution) |
|---|---|---|---|
| Ex. 1E Cyan | 100% cotton | 2.11 | 0.58 |
| | 65% PE 35% cotton | 2.04 | 0.43 |
| | Polyester Brook FKPD8 (PE) | 1.21 | 0.32 |
| | PVC wallpaper | 1.30 | 0.17 |

As can be seen in Table 2, ΔE values of the drawdowns are all below the preferred maximum of 3.00. ΔE values of the wash solution are all below 1.00. The ΔE figures are indicative of good binding between ink and substrate.

TABLE 3

ΔE Values of Ex. 2C Magenta digitally printed and dried on various fabrics. ΔE values (ink films) indicates color change of the fabrics before and after washing liquid immersion; ΔE (wash solution) indicates color change of the wash solution after the prints were immersed.

| Example | Substrate | Drop spacing (μm) | ΔE (ink films) | ΔE (wash solution) |
|---|---|---|---|---|
| Ex. 2C Magenta | 100% cotton | 31 | 1.72 | 0.29 |
| | | 40 | 1.61 | |
| | 65% PE 35% cotton | 31 | 2.02 | 0.43 |
| | | 40 | 1.77 | |
| | Polyester Brook FKPD8 (PE) | 31 | 1.65 | 0.25 |
| | | 40 | 1.20 | |
| | PVC wallpaper | 31 | 0.57 | 0.22 |
| | | 40 | 0.86 | |

As can be seen in Table 3, ΔE values of the cured digital ink films and washing liquid before and after submersion are all below the preferred maximum of 3.00. ΔE values of the wash solution are all below 1.00. The ΔE figures are indicative of good binding between ink and substrate.

TABLE 4

ΔE Values of Ex. 2C Magenta drawdowns dried and immersed in washing liquid. ΔE values (ink films) indicates color change of the drawdowns before and after washing liquid immersion; ΔE (wash solution) indicates color change of the wash solution after the prints were immersed.

| Example | Substrate | ΔE (ink films) | ΔE (wash solution) |
|---|---|---|---|
| Ex. 2C Magenta | 100% cotton | 2.66 | 0.60 |
| | 65% PE 35% cotton | 1.89 | 0.63 |
| | Polyester Brook FKPD8 (PE) | 1.76 | 0.27 |
| | PVC wallpaper | 1.60 | 0.45 |

As can be seen in Table 4, ΔE values of the drawdowns are all below the preferred maximum of 3.00. ΔE values of the wash solution are all below 1.00. The ΔE figures are indicative of good binding between ink and substrate.

TABLE 5

ΔE Values of Ex. 3C Yellow digitally printed and dried on various fabrics. ΔE values (ink films) indicates color change of the fabrics before and after washing liquid immersion; ΔE (wash solution) indicates color change of the wash solution after the prints were immersed.

| Example | Substrate | Drop spacing (μm) | ΔE (ink films) | ΔE (wash solution) |
|---|---|---|---|---|
| Ex. 3C Yellow | 100% cotton | 31 | 1.01 | 0.53 |
| | | 40 | 0.38 | |
| | 65% PE 35% cotton | 31 | 2.03 | 0.60 |
| | | 40 | 0.47 | |
| | Polyester Brook FKPD8 (PE) | 31 | 1.29 | 0.63 |
| | | 40 | 0.91 | |
| | PVC wallpaper | 31 | 1.13 | 0.17 |
| | | 40 | 0.80 | |

As can be seen in Table 5, ΔE values of the cured digital ink films and washing liquid before and after submersion are all below the preferred maximum of 3.00. ΔE values of the wash solution are all below 1.00. The ΔE figures are indicative of good binding between ink and substrate.

TABLE 6

ΔE Values of Ex. 3C Yellow drawdowns dried and immersed in washing liquid. ΔE values (ink films) indicates color change of the drawdowns before and after washing liquid immersion; ΔE (wash solution) indicates color change of the wash solution after the prints were immersed.

| Example | Substrate | ΔE (ink films) | ΔE (wash solution) |
|---|---|---|---|
| Ex. 3C Yellow | 100% cotton | 3.76 | 0.73 |
| | 65% PE 35% cotton | 0.87 | 0.57 |
| | Polyester Brook FKPD8 (PE) | 2.56 | 0.21 |
| | PVC wallpaper | 1.16 | 0.20 |

As can be seen in Table 6, ΔE values of the drawdowns are all below the preferred maximum of 3.00, with one exception –3.76 for 100% cotton, but still considered a pass. ΔE values of the wash solution are all below 1.00. The ΔE figures are indicative of good binding between ink and substrate.

TABLE 7

ΔE Values of Ex. 4C Black digitally printed and dried on various fabrics. ΔE values (ink films) indicates color change of the fabrics before and after washing liquid immersion; ΔE (wash solution) indicates color change of the wash solution after the prints were immersed.

| Example | Substrate | Drop spacing (μm) | ΔE (ink films) | ΔE (wash solution) |
|---|---|---|---|---|
| Ex. 4C Black | 100% cotton | 31 | 0.70 | 0.37 |
| | | 40 | 0.07 | |
| | 65% PE 35% cotton | 31 | 0.81 | 0.17 |
| | | 40 | 0.56 | |
| | Polyester Brook FKPD8 (PE) | 31 | 0.74 | 0.31 |
| | | 40 | 0.47 | |
| | PVC wallpaper | 31 | 2.89 | 0.49 |
| | | 40 | 0.95 | |

As can be seen in Table 7, ΔE values of the cured digital ink films and washing liquid before and after submersion are all below the preferred maximum of 3.00. ΔE values of the wash solution are all below 1.00. The ΔE figures are indicative of good binding between ink and substrate.

TABLE 8

ΔE Values of Ex. 3C Black drawdowns dried and immersed in washing liquid. ΔE values (ink films) indicates color change of the drawdowns before and after washing liquid immersion; ΔE (wash solution) indicates color change of the wash solution after the prints were immersed.

| Example | Substrate | ΔE (ink films) | ΔE (wash solution) |
|---|---|---|---|
| Ex. 4C Black | 100% cotton | 1.06 | 1.20 |
| | 65% PE 35% cotton | 0.68 | 0.74 |
| | Polyester Brook FKPD8 (PE) | 1.88 | 0.31 |
| | PVC wallpaper | 1.04 | 0.22 |

As can be seen in Table 8, ΔE values of the drawdowns are all below the preferred maximum of 3.00. ΔE values of the wash solution are all below 1.00. The ΔE figures are indicative of good binding between ink and substrate.

The invention claimed is:

1. A method of printing an image on a fibrous substrate by inkjet printing, wherein the method comprises applying a water-based ink composition onto the substrate, wherein the ink composition comprises a carboxylic acid functional co-polymer having an acid number of ≥225 mg KOH/g, a pigment, water and at least one organic co-solvent, wherein the carboxylic acid functional co-polymer is a poly(styrene-maleic acid) co-polymer and/or a poly(styrene-maleamic acid) co-polymer wherein the fibrous substrate is a textile;
wherein the poly(styrene-maleic acid) co-polymer and/or poly(styrene-maleamic acid) co-polymer does not contain maleic anhydride residues and/or maleic ester residues; and
wherein the carboxylic acid functional co-polymer functions as dispersant, surfactant, and binder in the composition.

2. The method according to claim 1 wherein, after applying the ink composition onto the substrate, the method comprises fixing the ink composition onto the substrate using NIR radiation or thermal curing.

3. Method according to claim 2, wherein the ink is suitable for deposition through at least a single nozzle.

4. Method according to claim 3 wherein the only co-polymer(s) in the ink composition is a poly(styrene-maleic acid) co-polymer and/or a poly(styrene-maleamic acid) co-polymer.

5. Method according to claim 1 wherein the carboxylic acid functional co-polymer has a molecular weight of ≥3,000 Daltons.

6. Method according to claim 1, wherein the carboxylic acid functional co-polymer has an acid value in the range of 250-450 mg KOH/g.

7. Method according to claim 1, wherein the carboxylic acid functional co-polymer is a salt and the counter-ion is selected from the group containing lithium, sodium, potassium, ammonium and quaternary ammonium salt of an organic amine, and combinations thereof.

8. Method according to claim 7, wherein the quaternary ammonium salt of an organic amine is selected from the group consisting of primary, secondary and tertiary aliphatic amines, hydroxyl-amines, alkoxyl amines, and combinations thereof.

9. Method according to claim 7 wherein the carboxylic acid functional co-polymer is selected from the group consisting of a di-sodium salt of poly(styrene-maleic acid) co-polymer and a mono-ammonium salt of poly(styrene-maleamic acid) co-polymer.

10. Method according to claim 7 wherein the carboxylic acid functional co-polymer is a mono-ammonium salt of poly(styrene-maleamic acid) co-polymer.

11. Method according to claim 1 wherein the composition comprises pigment particles which are at least Dv50 100-500 nm in diameter.

12. Method according to claim 1 wherein the composition comprises 0.1-7.5 wt % of a pigment, 0.1-20 wt % of a poly(styrene-maleic acid) co-polymer or a poly(styrene-maleamic acid) co-polymer, 2-30 wt % of an organic solvent and the remainder of the formulation deionized water.

13. Method according to claim 1, wherein the pH of the ink is 7.0-10.57.

14. Method according to claim 1 wherein the viscosity of the ink is 4-10 cP (as measured at 25° C. using a Brookfield DV-II+ Viscometer equipped with an Enhanced Brookfield UL Adapter 60 rpm).

15. Method according to claim 1, wherein the carboxylic acid functional co-polymer functions as dispersant, surfactant, and binder in the composition, and wherein the composition contains no other component(s) which perform the function of any one or more of dispersant, surfactant, and binder.

16. Method according to claim 1, wherein the composition further comprises at least one additional polymer.

17. Method according to claim 16, wherein the at least one additional polymer is selected from the group consisting of polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, and blends thereof.

18. Method according to claim 1 further comprising a wetting agent, wherein the wetting agent is a polyether siloxane co-polymer.

19. Method according to claim 1, wherein the fibrous substrate is a textile selected from the group consisting of cotton, rayon, silk, polyester, PET (Polyethylene terephthalate), viscose, nylon, polyimide, canvas, cashmere, chenille, chiffon, crepe, damask, georgette, gingham, jersey, lace, linen, polyvinyl chloride, leather, merino wool, modal, muslin, organza, wood, satin, spandex, suede, taffeta, toile, tweed, twill and velvet.

20. Method according to claim 1, wherein the fibrous substrate is a textile selected from the group consisting of cotton, polyester, PVC and blends thereof.

21. Method according to claim 1, wherein the substrates do not contain a chemical primer or chemical pre-treatment layer.

22. A decorated substrate prepared by method of claim 1.

* * * * *